United States Patent
Goff

(10) Patent No.: US 6,684,390 B1
(45) Date of Patent: Jan. 27, 2004

(54) MULTI-PROCESSOR JAVA SUBSYSTEM

(75) Inventor: Lonnie C. Goff, Tempe, AZ (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/550,446

(22) Filed: Apr. 17, 2000

(51) Int. Cl.$^7$ ............................................... G06F 9/45
(52) U.S. Cl. ..................................... 717/148; 709/105
(58) Field of Search ................................ 717/148, 149, 717/166, 167; 709/1, 100, 104, 105, 106

(56) References Cited

U.S. PATENT DOCUMENTS

| | | | | |
|---|---|---|---|---|
| 5,923,892 A | * | 7/1999 | Levy .............................. | 712/31 |
| 6,058,395 A | * | 5/2000 | Buzaglo et al. ................. | 707/10 |
| 6,075,938 A | * | 6/2000 | Bugnion et al. ............... | 703/27 |
| 6,240,440 B1 | * | 5/2001 | Kutcher ........................ | 709/102 |
| 6,269,391 B1 | * | 7/2001 | Gillespie ..................... | 709/100 |
| 6,295,645 B1 | * | 9/2001 | Brewer ........................ | 717/178 |
| 6,330,658 B1 | * | 12/2001 | Evoy et al. .................... | 712/31 |
| 6,374,286 B1 | * | 4/2002 | Gee et al. ..................... | 709/108 |
| 6,393,458 B1 | * | 5/2002 | Gigliotti et al. ............. | 709/203 |
| 6,496,871 B1 | * | 12/2002 | Jagannathan et al. ........ | 709/317 |

OTHER PUBLICATIONS

Berekovic, Mladen, Kloos, Helge, Pirsch, Peter, "Hardware Realization of a JAVA Virtual Machine for High Performance Multimedia Applications", p. 479–488, IEEE 1997, retrieved from IEEE database Mar. 26, 2003.*

Iyer, Deepak S., Chong, M.N., Cai, Wentong, "A Multi–Processor System for Video Coding Applications", p.210–213, iEEE 1997, retrieved from IEEE database Mar. 26, 2003.*

Mrva, Michael, Buchenrieder, Klaus, Kress, Rainer, "A Scalable Architecture for Multi–threaded JAVA Applications", Siemens AG, Corporate Technology, Germany, retrieved from IEEE database Mar. 26, 2003.*

* cited by examiner

*Primary Examiner*—Tuan Dam
*Assistant Examiner*—Mary Steelman
(74) *Attorney, Agent, or Firm*—Peter Zawilski

(57) ABSTRACT

A method and apparatus for supporting a host computer system in executing a JAVA computer program. An auxiliary system, including multiple non-host processors, coupled to a non-host memory, via a bus to the host computer system, interfaces with a JAVA Virtual Machine (JVM) to execute one or more threads of the JAVA computer program. The JVM can be instantiated in the non-host memory. The JVM performs allocation of an additional non-host processor for interfacing with the JVM to execute the new thread. The auxiliary system need not be a permanent part of the host computer system. In one embodiment the auxiliary system is coupled to the host computer system to run JAVA programs. The auxiliary system can be detached from the host computer system or can be implemented as a permanent part of the host computer system.

42 Claims, 6 Drawing Sheets

MULTI-PROCESSOR JAVA SUBSYSTEM

FIELD OF THE INVENTION

The present invention relates to the execution of JAVA computer programs. Specifically, the present invention relates to a method and a system tailored for executing JAVA computer programs.

BACKGROUND

JAVA programs support multi-threaded execution that permits the construction and execution of multiple parallel paths inside a single program. The multi-threaded construct is a technique used to simplify the creation and implementation of complex programs. It does not, however, improve the performance of a JAVA program. The parallel paths do not execute in parallel (i.e., simultaneously). In fact, program execution becomes slower due to the overhead associated thread switching. Moreover, relative to complied programs such as C++ programs, a JAVA program is executed very slowly because it is typically interpreted.

In addition, a JAVA Virtual Machine (JVM) can run only a single JAVA application. If multiple JAVA applications are launched by a computer system, multiple JVM's are instantiated, wherein each application runs inside its own JVM. Unless the host computer system is a multi-processor system (and most systems are not), none of the JAVA applications run simultaneously. Thus, on a single processor computer system, running multiple JAVA programs is severely burdened by having to run associated JVM's. However, for a typical user, converting an existing single processor computer system to a multi-processor computer system is not a cost effective option. Moreover, even if a multi-processor computer system is available, a user still needs to figure out how to coordinate the multiple processors to execute multiple JAVA applications and their associated JVM's.

Several prior art approaches exist for improving the performance of JAVA programs. These strategies include: the use of a native JAVA processor, and multi-processor execution of native JAVA threads.

The native JAVA processor is a specialized CPU whose machine instruction code is the un-interpreted JAVA Byte Code. This approach will certainly improve performance. However, this approach precludes compatibility with vast amounts of software that already exists for industry standard processors (e.g., X86, ARM, etc.).

The multi-processor native thread system is structured to execute native threads that a JAVA software program may call from inside the JVM. This is a very special and rare exception that provides performance improvement only when a JAVA program implements multiple threads executing non-JAVA code. This is too convoluted to be anything but a specialized case. As such, this system is not well suited for executing JAVA computer programs in general.

Thus, a need exists in general for improving the execution speed of a JAVA program. Specifically, a need exists for performing multi-threaded execution inside a single JAVA program while not suffering performance penalty due to thread switching. A further need exists for improving performance of JAVA programs while without becoming incompatible with existing software. An additional need exists for improving performance of JAVA programs while without relying on very limited and specialized approach. A need also exists for improving performance for running multiple JAVA programs while without having to replace a user's existing computer system.

SUMMARY

The present invention provides generally a method and a system for improving the execution speed of JAVA programs. Specifically, the present invention provides multi-threaded execution inside a single JAVA program while not suffering performance penalty due to thread switching. The present invention further provides improved performance of JAVA programs while being compatible with existing software. The present invention additionally provides improved performance for JAVA programs while without relying on specialized approach not applicable to JAVA programs in general. The present invention also provides improved performance for running multiple JAVA programs while without having to replace a user's existing computer system.

In one embodiment of the present invention, an auxiliary system of multiple processors is coupled via a bus to a user's host computer system for supporting the host computer system in executing the JAVA computer program. The auxiliary system includes multiple non-host processors coupled to a non-host memory. A non-host processor from these non-host processors is adapted to interface with a JAVA Virtual Machine (JVM) for executing one or more threads of the JAVA computer program. The JVM can be instantiated in the non-host memory. For executing a new thread, the JVM allocates an additional non-host processor for interfacing with the JVM to execute the new thread.

In the present embodiment, the auxiliary system need not be a permanent part of the host computer system. That is, the auxiliary system can be coupled to the host computer system as the need arises to run JAVA programs. Moreover, the auxiliary system can be detached from the host computer system if desired. However, optionally, the auxiliary system can be implemented as a permanent part of the host computer system, i.e., without being detachable from the host computer system.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Figure 1:
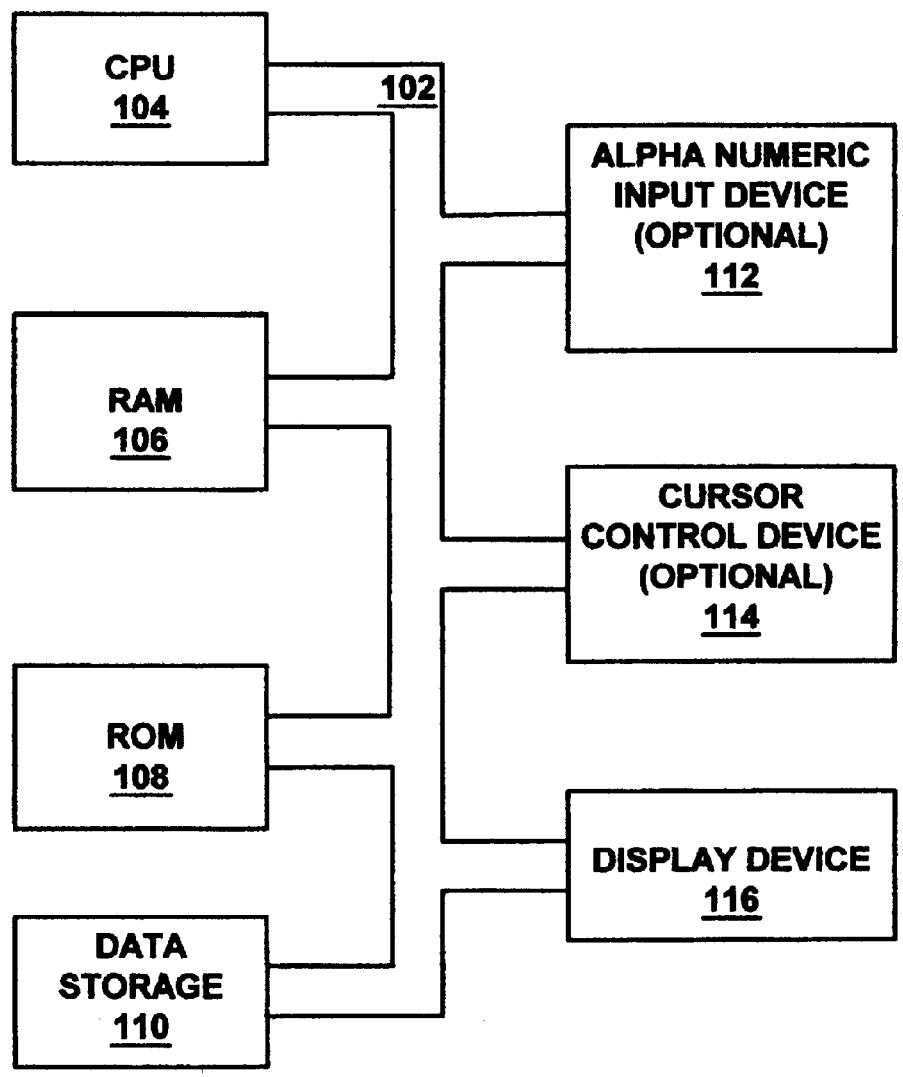
FIG. 1 depicts a generic computer system.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the present invention, discussions utilizing terms such as "processing" or "computing" or "performing" or "calculating" or "determining" or "running" or "instantiating" or "executing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

With reference now to FIG. 1, portions of the present method and system are comprised of computer-readable and computer-executable instructions which reside, for example, in computer-usable media of a computer system. FIG. 1 illustrates an exemplary computer system 100 used in accordance with one embodiment of the present invention. It is appreciated that system 100 of FIG. 1 is exemplary only and that the present invention can operate within a number of different computer systems including general purpose networked computer systems, embedded computer systems, and stand alone computer systems. Additionally, computer system 100 of FIG. 1 is well adapted to having computer readable media such as, for example, a floppy disk, a compact disc, and the like coupled thereto. Such computer readable media is not shown coupled to computer system 100 in FIG. 1 for purposes of clarity.

System 100 of FIG. 1 includes an address/data bus 102 for communicating information, and a central processor unit 104 coupled to bus 102 for processing information and instructions. Central processor unit 104 may be an 80×86-family microprocessor. System 100 also includes data storage features such as a computer usable volatile memory 106, e.g. random access memory (RAM), coupled to bus 102 for storing information and instructions for central processor unit 104, computer usable non volatile memory 108, e.g. read only memory (ROM), coupled to bus 102 for storing static information and instructions for the central processor unit 104, and a data storage device 110 (e.g., a magnetic or optical disk and disk drive) coupled to bus 102 for storing information and instructions. System 100 of the present invention also includes an optional alphanumeric input device 112 including alphanumeric and function keys is coupled to bus 102 for communicating information and command selections to central processor unit 104. System 100 also optionally includes a cursor control device 114 coupled to bus 102 for communicating user input information and command selections to central processor unit 104. System 100 of the present embodiment also includes an optional display device 116 coupled to bus 102 for displaying information.

Referring still to FIG. 1, optional display device 116 of FIG. 1, may be a liquid crystal device, cathode ray tube, or other display device suitable for creating graphic images and alphanumeric characters recognizable to a user. Optional cursor control device 114 allows the computer user to dynamically signal the two dimensional movement of a visible symbol (cursor) on a display screen of display device 116. Many implementations of cursor control device 114 are known in the art including a trackball, mouse, touch pad, joystick or special keys on alphanumeric input device 112 capable of signaling movement of a given direction or manner of displacement. Alternatively, it will be appreciated that a cursor can be directed and/or activated via input from alphanumeric input device 112 using special keys and key sequence commands. The present invention is also well suited to directing a cursor by other means such as, for example, voice commands. A more detailed discussion of the embodiments of the present invention are found below.

Figure 2:
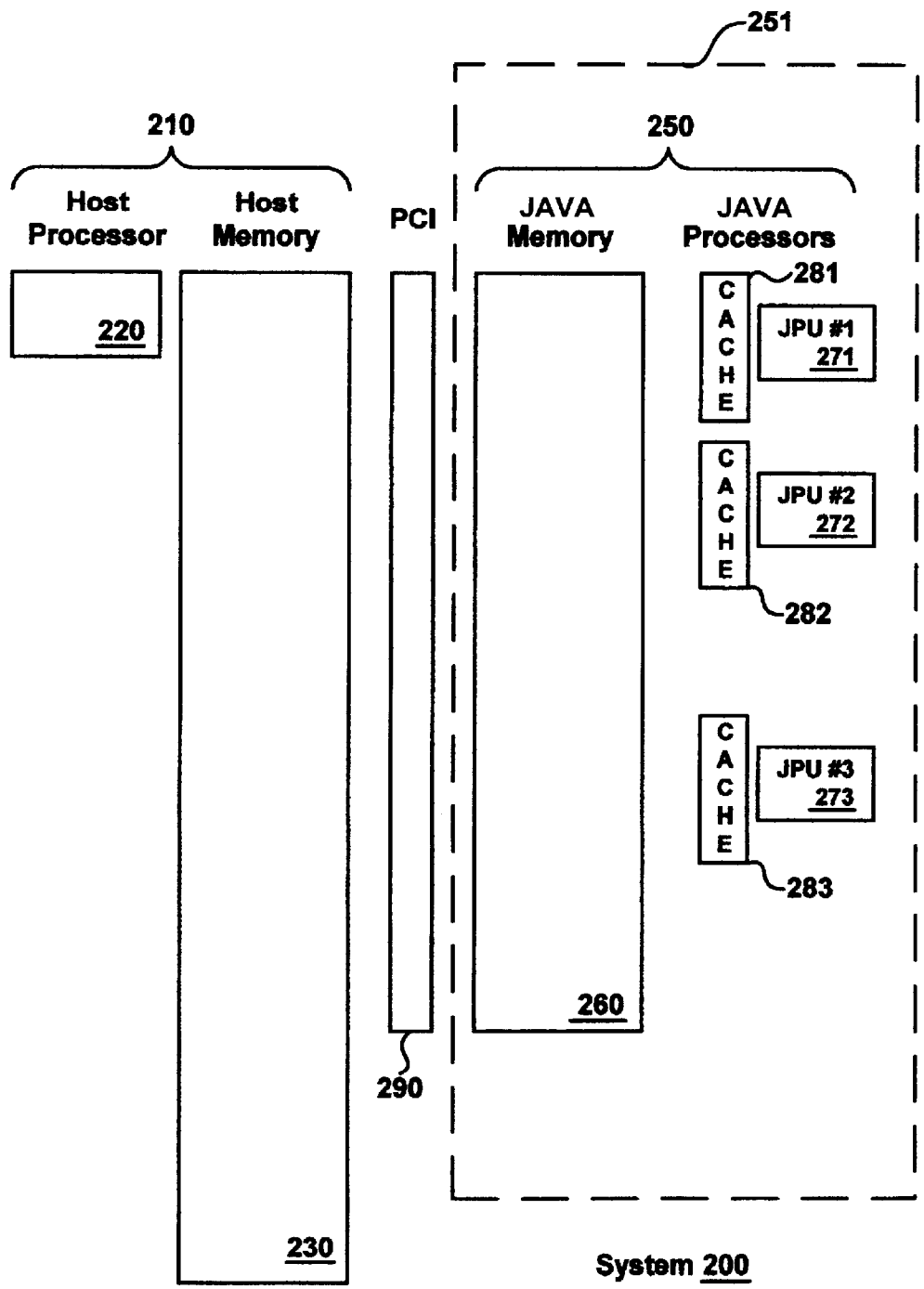
FIG. 2 depicts a system block diagram in accordance with one embodiment of the present invention.

Referring now to FIG. 2, a system 200 in accordance with one embodiment of the present invention is shown as a block diagram. System 200 includes a host computer system 210 and an auxiliary system 250. These two systems (210 and 250) are coupled via a bus 290. System 200 improves execution speed of a JAVA program by distributing the work load between host computer system 210 and auxiliary system 250.

Referring still to FIG. 2, host computer system 210 includes a host processor 220 and a host memory 230. In the present embodiment, host processor 220 is a X86 compatible processor such as an Intel Pentium type of processor. However, host processor 220 need not be a X86 compatible processor. For example, in another embodiment, a different type of processor such as a RISC processor is used.

Continuing with FIG. 2, auxiliary system 250 includes a "JAVA memory" as a non-host memory 260 and the three "JAVA processor units" (JPU's) as the three non-host processors shown here (271–273). Non-host processors 271–273 are coupled, respectively, to caches 281–283, which in turn are coupled to non-host memory 260. Nonhost memory 260 is a dual port memory. However, in another embodiment, non-host memory 260 need not be a dual port memory. As contemplated herein, the processor type of non-host processors (271–273) need not match the processor type of host processor. Thus, in the present embodiment, non-host processors 271 273 are RISC processors such as ARM processors. However, non-host processors 271–273 need not be ARM processors. In another embodiment, non-host processors 271–273 are implemented as RISC processors different from ARM processors. In yet other embodiment, X86 compatible processors can be used as non-host processors 271–273. Furthermore, as understood herein, one or more non-host processors can be implemented such that the number of non-host processors need not be fixed at three. Specifically, the types and numbers of non-host processors 271–273 in auxiliary system 250 will be hidden from host computer system 210. Also, in another embodiment, auxiliary system 250 need not include a cache for each non-host processor.

Referring still to FIG. 2, auxiliary system 250 need not be implemented as a permanent part of system 200. Specifically, auxiliary system 250 can be made as a detachable unit from the host computer system. In one embodiment, detachable auxiliary system 250 is housed within a PC card denoted by dotted line 251. As such, a user can improve the performance of running JAVA programs on an existing computer system simply by coupling PC card 251 to the existing computer system. Also, each non-host processor can be specifically optimized for executing JAVA codes, thus further improving JAVA performance.

Figure 3:
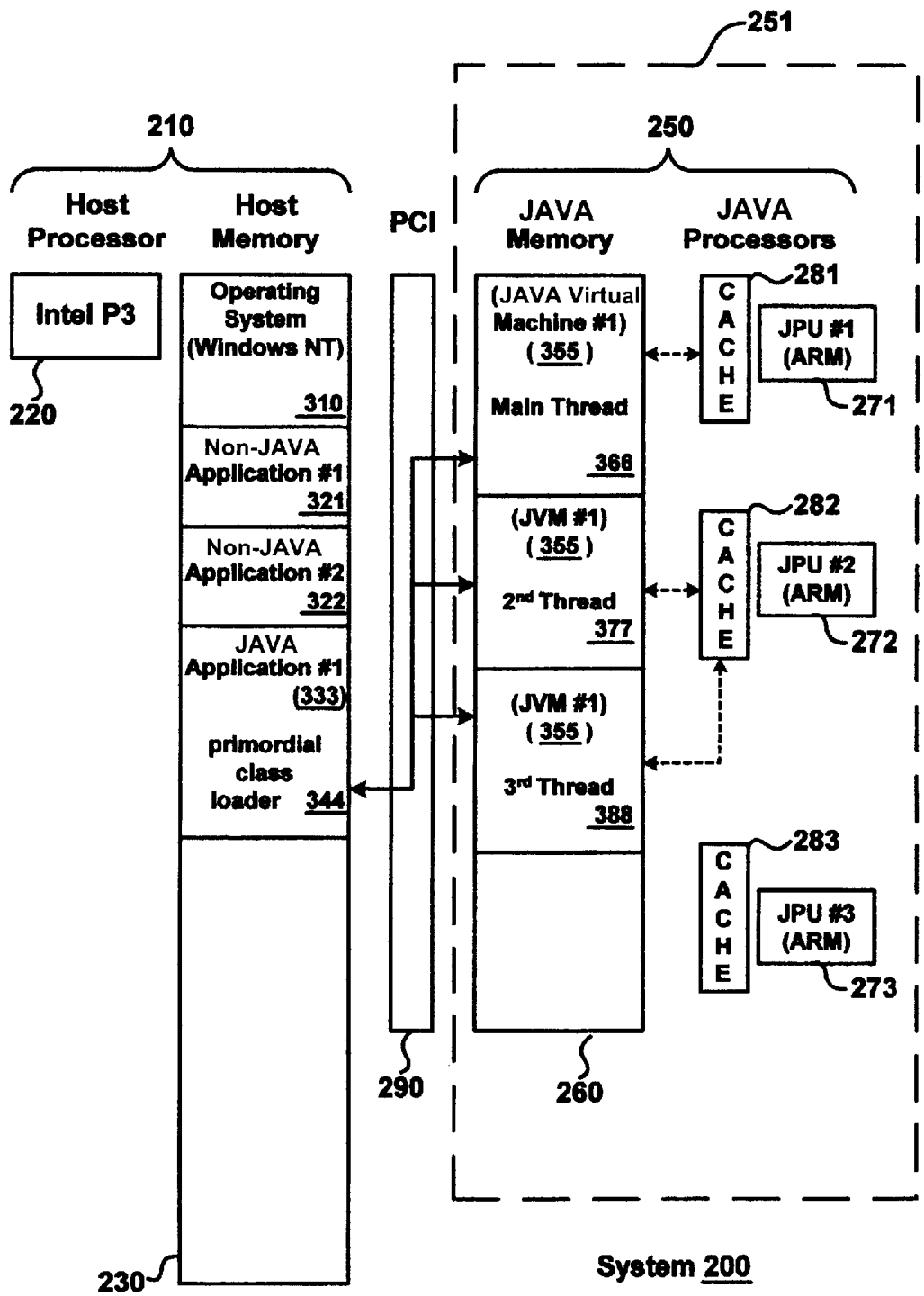
FIG. 3 depicts the execution of a JAVA application with respect to system 200 (described in FIG. 2) in accordance with one embodiment of the present invention.

Referring now to FIG. 3, the interplay of various computer programs with system 200 is shown in accordance with one embodiment of the present invention. In particular, these software programs include an operating system (OS) 310, two non-JAVA applications 321–322, and a JAVA application 333.

As shown in FIG. 3, OS 310 is loaded in host memory 220 and executed by host processor 220. In the present embodiment, OS 310 is Windows NT. However, in another embodiment, an OS different from Windows NT (such as UNIX or VxWorks) is implemented as OS 310. Non-JAVA applications 321–322 are also loaded in host memory 230 and executed by host processor 220.

On the other hand, JAVA application 333 is executed by system 200 such that both host computer system 210 and auxiliary system 250 are involved. Specifically, as JAVA application 333 is launched, its primordial class loader (PCL) 344 is loaded in host memory 230 and executed by host processor 220. PCL 344 in turn performs the allocation of a non-host processor from across bus 290 in order to execute JAVA application 333. If a non-host processor, say non-host processor 271, is allocated, a JVM 355 is instantiated by PCL 344 within non-host memory 260 to interface with nonhost processor 271. In turn, main thread 366 of JAVA application 333 is executed by non-host processor 271 via JVM 355.

As understood herein, PCL 344 has been modified from a preexisting PCL so that the above allocation step and instantiation step can be performed. However, the above allocation step and instantiation step need not be performed by PCL 344. In fact, any PCL in the present invention can be flexible in its implementation. A PCL (such as PCL 344) is the launch pad for JAVA execution. It is the bridge between host computer system 210 and JVM 355.

Specifically, a PCL is a non-JAVA application written for and executed by the host processor. The pre-existing PCL has the normal duties of loading and initializing a JVM. Now in its modified form, the PCL will perform non-host processor recruitment (allocation), assignment and initialization. The PCL also establishes the runtime I/O bridge between the various I/O classes defined in the JAVA I/O package and host computer system 210. Moreover, the PCL stores the JAVA executables (i.e., the JVM and associated application, or the JVM Execution Engine and associated thread) into non-host memory 260. When given execution time by host computer system 210, the PCL posts and retrieves I/O control and data information between host memory 230 and non-host memory 260.

If another thread (such as thread 377) of JAVA application 333 such as thread 377 is to be executed, JVM 355 calls its method start( ) that searches for another non-host processor to interface with JVM 355 and execute thread 377. The method start( ) is understood herein to belong to the JAVA API. Specifically, the method start( ) is a method of Thread class in accordance with the JAVA API. If a non-host processor, for example non host processor 272, is available, then this available non-host processor interfaces with JVM 355 and executes thread 377. Otherwise, if no other non-host processor is available for interfacing with JVM 355 to execute thread 377, then non-host processor 271 will execute thread 377 in addition to main thread 366.

As understood herein, a JVM (such as JVM 355) can be flexible in its implementation. That is, various versions of a JVM can be implemented as long as certain rules are observed by the JVM. In the present embodiment, JVM 355 has been modified from a typical JVM so that the above processor searching step can be performed. In particular, when called, the method start( ) has been modified to search for an available non-host processor. If a new non-host processor is available, the method start( ) initializes the new non-host processor to execute the new thread. If a new non-host processor is not available, the method start( ) initializes the current non-host processor to share thread execution.

Continuing with FIG. 3, if yet another thread (such as thread 388) of JAVA application 333 is to be executed, JVM 355 calls its start( ) method which searches for yet another non-host processor to interface with JVM 355 and execute thread 388. If a non-host processor, for example non-host processor 273, is available, then it interfaces with JVM 355 and execute thread 388. Otherwise, if no more non-non-host processors are available for interfacing with JVM 355 to execute thread 388, either non-host processor 272 or non-host processor 271 will execute thread 388. As shown in FIG. 3, non-host processor 273 is assumed to be unavailable for executing thread 388; thus, non-host processor 272 is executing both thread 377 and thread 388.

Figure 4:
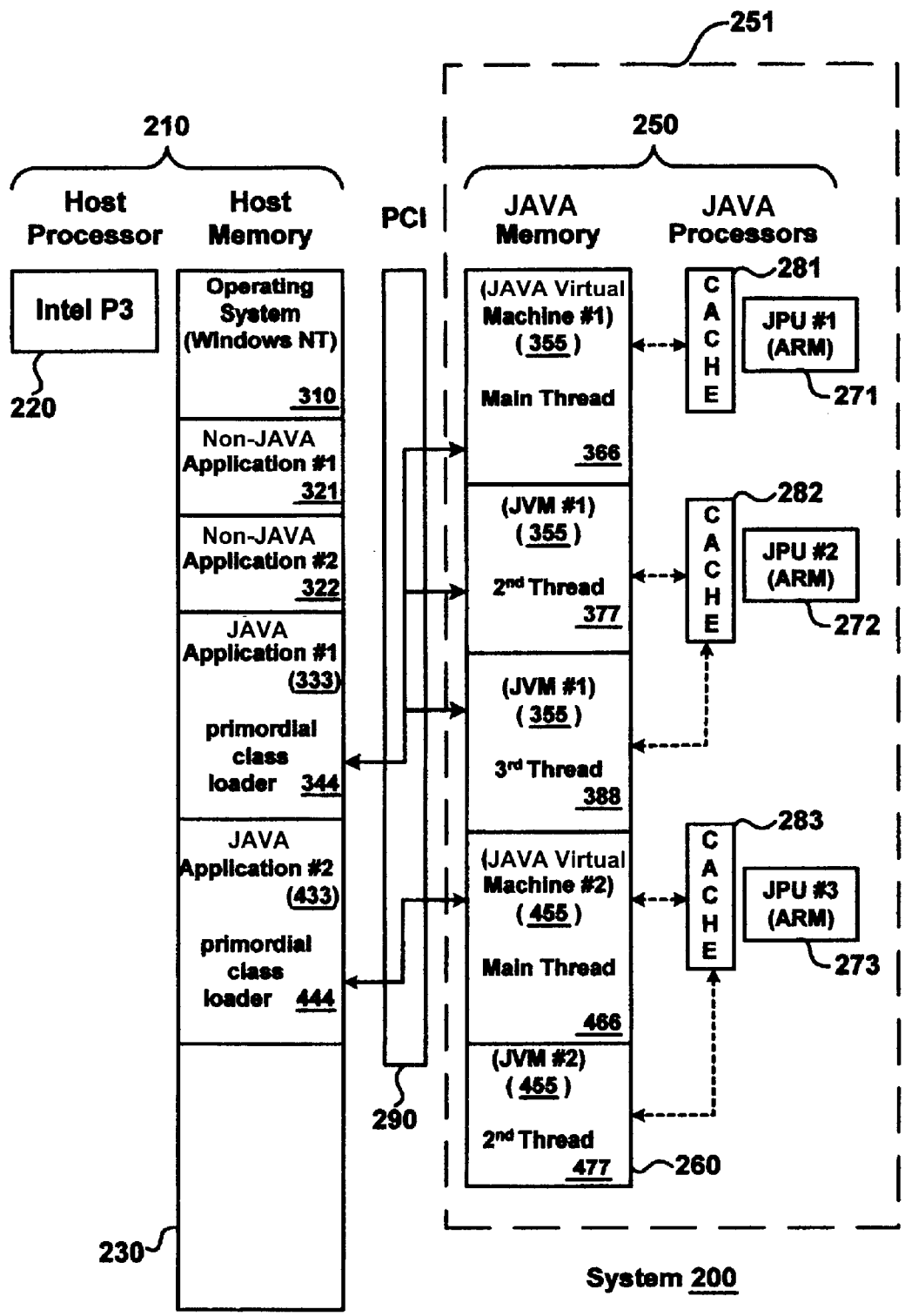
FIG. 4 depicts the execution of an additional JAVA application with respect to system 200 (described in FIG. 2) in accordance with one embodiment of the present invention.

Referring now to FIG. 4, an additional JAVA application 433 is launched. Specifically, as JAVA application 433 is launched, its primordial class loader (PCL) 444 is loaded in host memory 230 and executed by host processor 220. PCL 444, in turn, performs allocation of a non-host processor from across bus 290 in order to execute JAVA application 333. If a non-host processor, say non-host processor 273, is allocated, a JVM 455 is instantiated by PCL 444 within non-host memory 260 to interface with non host processor 273. In turn, main thread 466 of JAVA application 433 is executed by non-host processor 273 via JVM 455.

Referring still to FIG. 4, if another thread (such as thread 477) of JAVA application 433 such as thread 477 is to be executed, JVM 455 calls its start( ) method to search for another non-host processor to interface with JVM 455 and execute thread 477. If a non-host processor is available, then it interfaces with JVM 455 and executes thread 477. Otherwise, as is shown in FIG. 4, if no more non-host processors are available for interfacing with JVM 455 to execute thread 477, then non-host processor 273 will execute thread 477 in addition to main thread 466.

Figure 5:
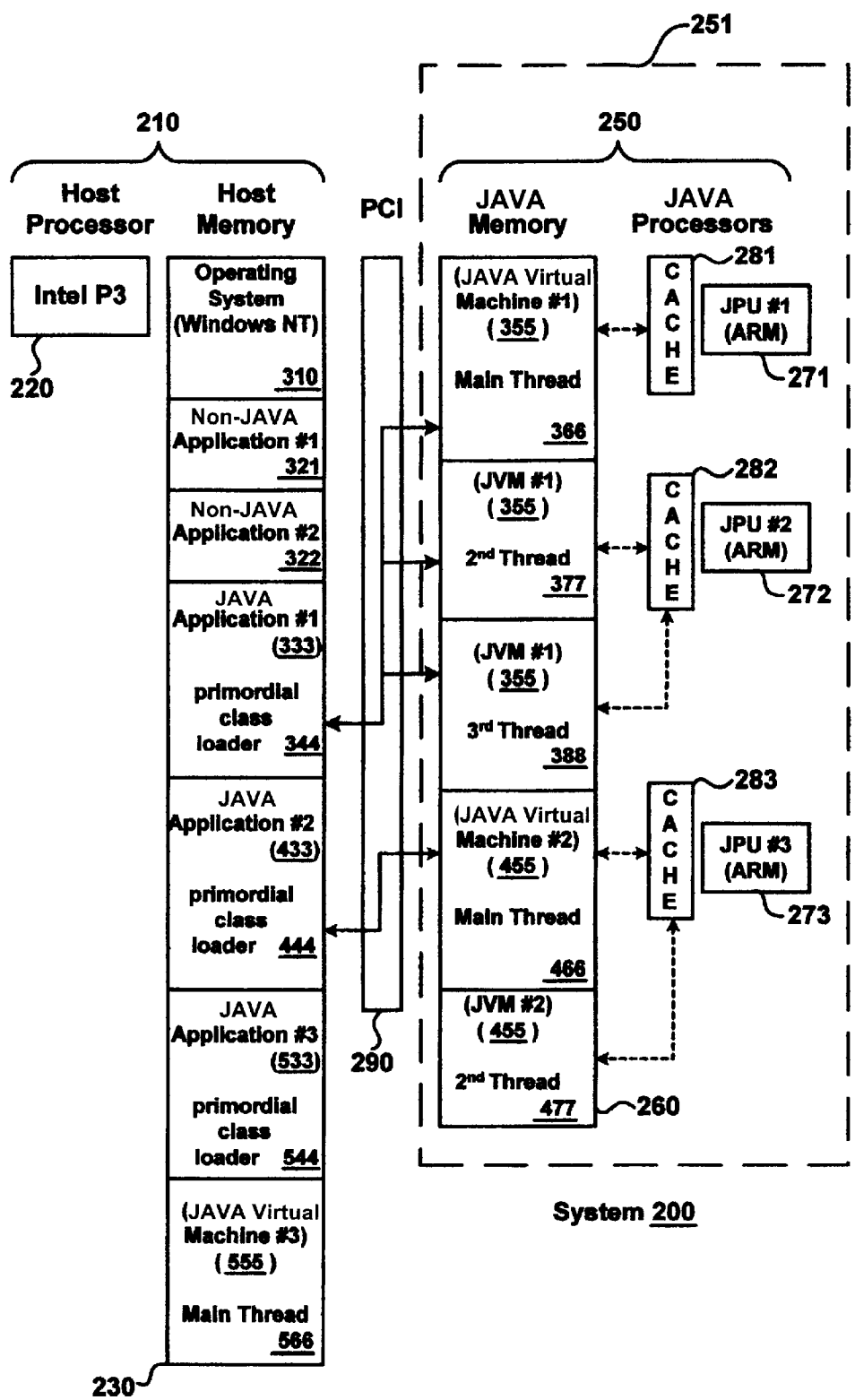
FIG. 5 depicts the execution of yet another JAVA application with respect to system 200 (described in FIG. 2) in accordance with one embodiment of the present invention.

Referring now to FIG. 5, yet another JAVA application 533 is launched. Specifically, as JAVA application 533 is launched, its primordial class loader (PCL) 544 is loaded in host memory 230 and executed by host processor 220. PCL 544 in turn performs allocation of a non-host processor from across bus 290 in order to execute JAVA application 533. If a non-host processor is allocated, a JVM 555 is instantiated by PCL 544 within non host memory 260 to interface with the allocated non-host processor. In turn, main thread 566 of JAVA application 533 is executed by the allocated non-host processor via JVM 555. Otherwise, as is shown in FIG. 5, when no non-host processor is available for interfacing with JVM 555 to execute main thread 566, then PCL 544 instantiates JVM 555 in host memory 230 for interfacing with host processor 220 to execute main thread 566. If another thread of JAVA application 533 is to be executed, then host processor 220 will execute the thread in addition to main thread 566.

Figure 6:
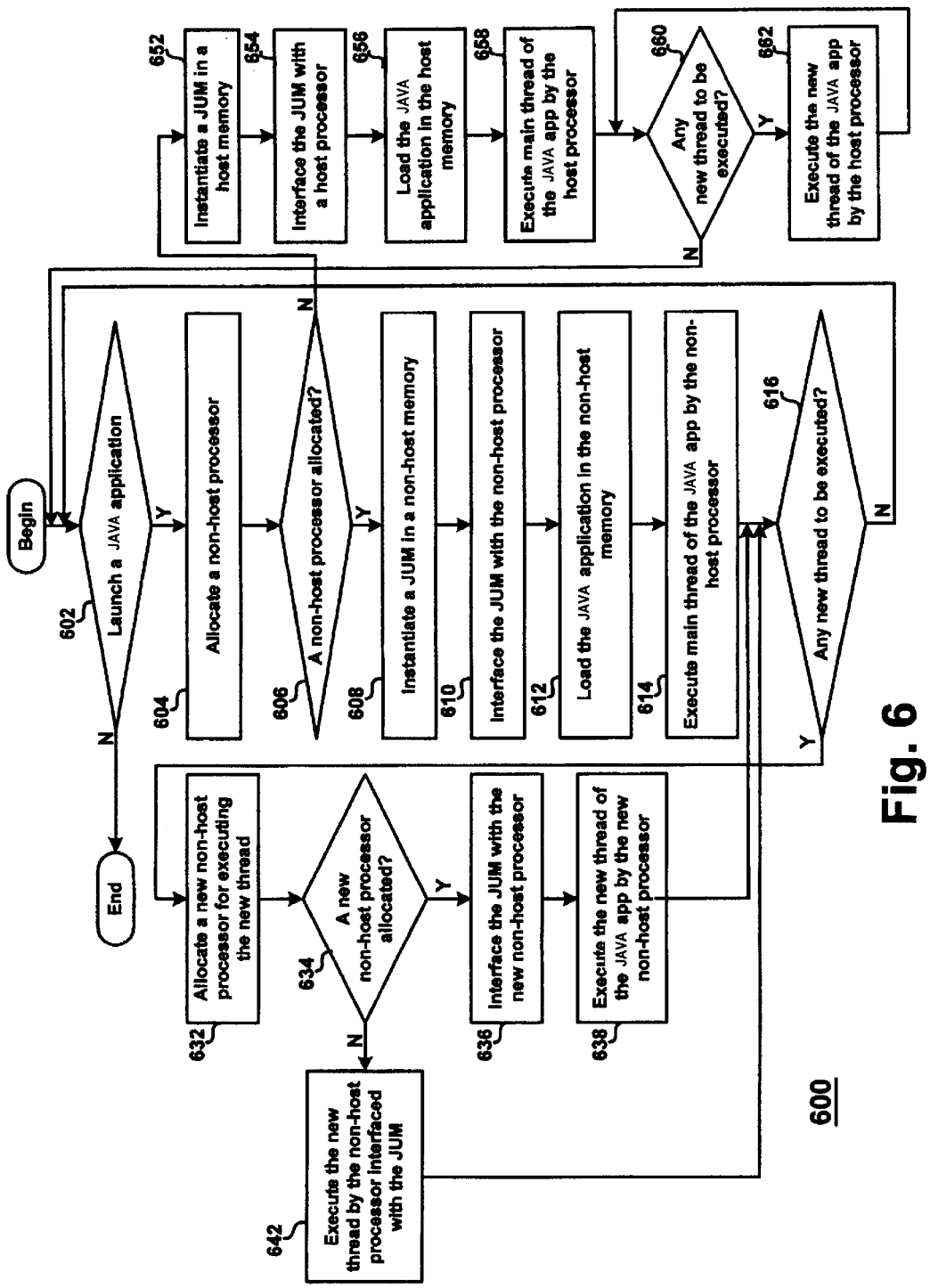
FIG. 6 is a flow chart outlining steps performed in accordance with one embodiment of the present invention.

Referring now to FIG. 6, a flow chart 600 is shown outlining steps in one embodiment of the present invention. In the present embodiment, these steps are performed by a computer system that includes a host computer system and an auxiliary system. Specifically, the host computer system includes a host processor and a host memory. Moreover, the host computer system is coupled via a bus to the auxiliary system that includes a non-host memory and one or more non-host processors. The bus is a PCI bus. However, in another embodiment, a bus different from a PCI bus can be implemented, such as, for examples, an ASB bus, an ISA bus, a USB bus, or an IEEE 1394 bus.

In the present embodiment, the non-host memory and the non-host processors are housed within a PC card adapted to be coupled to the host computer system. Furthermore, in such an embodiment, the PC card is detachable from the host computer system. Also, the non-host memory is coupled to said host computer system as a dual port memory. Caches are coupled to these non-host processors. The non-host processors are ARM processors.

In query step 602, a host computer system having a host processor and a host memory checks if any JAVA application is to be launched. If a JAVA application is to be launched, step 604 is performed.

In step 604, allocation is performed to allocate a first non-host processor from a pool of non-host processors auxiliary to the host computer system. The allocated first non-host processor is adapted for interfacing with a first JVM.

In query step 606, if no non-host processor is allocated, step 652 is performed next. Otherwise, if the first non-host processor has been allocated, step 608 is performed.

In step 608, the first JVM is instantiated in a non-host memory auxiliary to said host computer system. In the present embodiment, the first JVM is instantiated in the non-host memory by a first PCL executed by the OS running on the host computer system.

In step 610, the first JVM interfaces with the first non-host processor for executing one or more threads of the JAVA application.

In step 612, the JAVA application is loaded in the non-host memory, ready to be executed by the first non-host processor.

In step 614, the main thread of the JAVA application is executed by the first non-host processor.

In query step 616, a check is performed to see if any new thread is to be executed. If no new thread is to be executed, then query step 602 is performed again. Otherwise, if a new thread is to be executed, step 632 is performed next.

In step 632, the first JVM performs allocation of a second non-host processor for executing the new thread. In the present embodiment, the first JVM calls its start( ) method to implement this allocation.

In query step 634, a check is performed to see if the allocation of the second non-host processor is successful. If the allocation is not successful, then step 642 is performed. Otherwise, if the allocation is successful, then step 636 is performed.

In step 642, following the unsuccessful allocation of a second nonhost processor, the new thread is executed by the first non-host processor that is already interfaced with the first JVM.

In step 636, following the successful allocation of a second non-host processor, the first JVM interfaces with the second non-host processor.

In step 638, the new thread is executed by the second non-host processor. In turn, query step 616 is performed again.

Referring back to query step 606, if the allocation of a first non-host processor is unsuccessful, then step 652 is performed.

In step 652, a first JVM is instantiated by a first PCL in the host memory.

In step 654, the first JVM in the host memory interfaces with the host processor.

In step 656, the JAVA application is loaded in the host memory.

In step 658, the main thread of the JAVA application is executed by the host processor via the first JVM running in the host memory.

In step 660, a check is performed to see if any new thread of the JAVA application is to be executed. If no new thread is to be executed, query step 602 is performed again. Otherwise, if a new thread is to be executed, step 662 is performed.

In step 662, the new thread is executed by the host processor. In turn, query step 660 is performed again.

If another JAVA application is to be executed, steps of flow chart 600 are performed again. Specifically, referring back to query step 602 after the first JAVA application has been launched, if a second JAVA application is to be launched, then the OS will execute a second PCL to instantiate a second JVM. This second JVM will be instantiated in the non-host memory (by step 608) provided that a new non-host processor can be allocated (by step 604) to interface with the second JVM (by step 610) for executing the threads of the second JAVA application (by step 614).

If a new thread of the second JVM is to be executed, the second JVM allocates a new non-host processor (by step 632) for executing the new thread. If a new non-host processor is allocated, the second JVM interfaces with the new non-host processor (by step 636). In turn, the new non-host processor executes the new thread (by step 638). Otherwise, if a new non-host processor is unavailable for allocation, the non-host processor currently interfaced with the second JVM will execute the new thread (by step 642).

If not even one non-host processor is allocated for interfacing with the second JVM, this second JVM will be instantiated by the second PCL in the host memory (by step 652) to interface with the host processor (by step 654) in executing the second JAVA application (by step 658).

Likewise, after the first and second JAVA applications have been launched, if a third JAVA application is to be launched, then the OS will execute a third PCL to instantiate a third JVM. This third JVM will be instantiated in the non-host memory (by step 608) provided that a non-host processor can be allocated (by step 604) to interface with the third JVM (by step 610) for executing the threads of the third JAVA application (by step 614).

If a new thread of the third JVM is to be executed, the third JVM allocates a new non-host processor (by step 632) for executing the new thread. If a new non-host processor is allocated, the third JVM interfaces with the new non-host processor (by step 636). In turn, the new non-host processor executes the new thread (by step 638). Otherwise, if a new non-host processor is unavailable for allocation, the non-host processor currently interfaced with the third JVM will execute the new thread (by step 642).

If not even one non-host processor is allocated for interfacing with the third JVM, this third JVM will be instantiated by the third PCL in the host memory (by step 652) to interface with the host processor (by step 654) in executing the third JAVA application (by step 658).

Hence, the present invention provides generally a method and a system for improving the execution speed of JAVA programs. The present invention provides multi-threaded execution inside a single JAVA program while not suffering performance penalty due to thread switching. The present invention further provides improved performance of JAVA programs while being compatible with existing software. The present invention additionally provides improved performance for JAVA programs while without relying on specialized approach not applicable to JAVA programs in general. The present invention also provides improved performance for running multiple JAVA programs while without having to replace a user's existing computer system.

In summary, the present invention advantageously provides performance improvements to either multiple instantiations of JVM's or multi-threaded JAVA applications or both. The software modifications required for the system are straight forward as changes are primarily be isolated to the JAVA PCL and to several classes in the core JAVA Language and I/O packages). Moreover, the hardware required to build the multi-processor auxiliary system is neither expensive, nor overly complex.

Also advantageously, the present invention makes no restriction on the type of host system (i.e., OS and processors) which can be used to implement the multi-processor JAVA subsystem. As an example, for a Windows machine the JAVA subsystem could reside on a PCI add-in card and consist of multiple ARM processors attached to a dual ported PCI memory subsystem.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. For a host computer having a host processor and a host memory, an auxiliary system coupled via a bus to said host computer system for supporting said host computer system in executing a downloadable application computer program, said auxiliary system comprising:

a plurality of non-host processors, including a first non-host processor, the non-host processors adapted for interfacing with a first downloadable application virtual machine (DAVM) to execute one or more threads of said downloadable application computer program, wherein for executing an additional thread, said first DAVM performs allocation of a second non-host processor for interfacing with said first DAVM to execute said additional thread, and wherein provided that no non-host processor is available for interfacing with said first DAVM to execute said additional thread, said first non-host processor executes said additional thread; and a non-host memory coupled to said non-host processors, said non-host memory adapted for storing said first DAVM.

2. The auxiliary system of claim 1, wherein said first DAVM calls its start( ) method to allocate said second non-host processor to interface with said first DAVM.

3. The auxiliary system of claim 1, wherein said first DAVM is instantiated in said non-host memory by a first primordial class loader (PCL) in said host memory, said first PCL executed by said host processor.

4. The auxiliary system of claim 1, wherein provided no non-host processor is available for interfacing with said first DAVM, said first DAVM is instantiated in said host memory by a first PCL in said host memory, said first PCL executed by said host processor.

5. The auxiliary system of claim 1, wherein for executing an additional downloadable application computer program, a third non-host processor is allocated for interfacing with a second DAVM instantiated within said non-host memory, said third non-host processor interfaced with said second DAVM for executing one or more threads of said additional downloadable application computer program.

6. The auxiliary system of claim 5, wherein provided that no non-host processor is available for executing said additional downloadable application computer program, said second DAVM is instantiated in said host memory by a second PCL in said host memory.

7. The auxiliary system of claim 1, wherein said non-host memory is a dual port memory.

8. The auxiliary system of claim 1, wherein a plurality of instruction caches are coupled to said non-host processors.

9. The auxiliary system of claim 1, wherein said plurality of non-host processors are ARM processors.

10. The auxiliary system of claim 1, wherein said auxiliary system is detachable from said host computer system.

11. The auxiliary system of claim 10, wherein said detachable auxiliary system is housed within a PC card.

12. A computer implemented method for executing a downloadable application computer program, said method comprising the steps of:

a) allocating a first non-host processor auxiliary to a host computer system having a host processor and a host memory, said first non-host processor adapted for interfacing with a first DAVM, wherein said first non-host processor belongs to a plurality of non-host processors auxiliary to said host computer system, said plurality of non-host processors coupled to said non-host memory; and b) provided said first non-host processor has been allocated, instantiating said first DAVM in a non-host memory auxiliary to said host computer system, said first DAVM interfacing with said first non-host processor for executing one or more threads of said downloadable application computer program;

c) prior to executing a new thread of said downloadable application computer program, allocating a second non-host processor from said plurality of non-host processors, said second non-host processor for interfacing with said first DAVM to execute said new thread; and d) provided in said step c) no non-host processor from said plurality is available for executing said new thread, assigning said new thread to be executed by said first non-host processor already interfaced with said first DAVM.

13. The computer implemented method of claim 12, wherein said step a) and step b) are implemented using a first PCL within said host memory, said first PCL executed by said host processor.

14. The computer implemented method of claim 12, further comprising the step of:

e) provided no non-host processor from said plurality of non-host processors is available for interfacing with said first DAVM, instantiating said first DAVM in said host memory, said first DAVM interfacing with said host processor for executing one or more threads of said downloadable application computer program.

15. The computer implemented method of claim 12, wherein in said step c), said first DAVM calls start( ) method to allocate said second non-host processor to interface with said first DAVM.

16. The computer implemented method of claim 12, wherein for executing an additional downloadable application computer program, said computer implemented method further comprises the steps of:

f) allocating a third non-host processor from said plurality of processors, said third non-host processor adapted for interfacing with a second DAVM;

g) provided said third non-host processor has been allocated, instantiating said second DAVM in said non-host memory, said second DAVM interfacing with said non-host third processor for executing one or more threads of said additional downloadable application computer program; and h) prior to executing a new thread of said additional downloadable application computer program within said second DAVM, allocating from said plurality of non-host processors for a fourth non-host processor for interfacing with said second DAVM to execute said new thread.

17. The computer implemented method of claim 16, further comprising the step of:

i) provided no non-host processor is available for interfacing with said second DAVM, instantiating said second DAVM in said host memory, said second DAVM interfacing with said host processor for executing one or more threads of said additional downloadable application computer program.

18. The computer implemented method of claim 16, further comprising the step of:

j) provided in said step h) no additional non-host processor from said plurality of non-host processors is available for executing said new thread, assigning said new thread to be executed by said third non-host processor already interfaced with said second DAVM.

19. The computer implemented method of claim 16, wherein said step f) and step g) are implemented using a second PCL within said host memory, said second PCL executed by said host processor.

20. The computer implemented method of claim 16, wherein said step h) is performed using said second DAVM.

21. The computer implemented method of claim 12, wherein said plurality of non-host processors are ARM processors.

22. The computer implemented method of claim 12, wherein a plurality of instruction caches are coupled to said non-host processors.

23. The computer implemented method of claim 12, wherein said non-host memory is coupled as a dual port memory to said host computer system.

24. The computer implemented method of claim 12, wherein said host computer system is coupled via a bus to said non-host memory and said plurality of non-host processors.

25. The computer implemented method of claim 24, wherein said bus is a (peripheral component interconnect) PCI bus.

26. The computer implemented method of claim 12, wherein said non-host memory and said plurality of non-host processors are housed within a PC card adapted to be coupled to said host computer system, said PC card detachable from said host computer system.

27. For a composite computer system comprising a host computer system having coupled thereto an auxiliary system, a computer readable medium having stored therein computer readable code for causing said composite computer system to perform the steps of:

a) allocating a first non-host processor of said auxiliary system that is auxiliary to said host computer system having a host processor and a host memory, said first non-host processor adapted for interfacing with a first DAVM; and b) provided said first non-host processor has been allocated, instantiating said first DAVM in a non-host memory of said auxiliary system, said first DAVM interfacing with said first non-host processor for executing one or more threads of said downloadable application computer program;

c) prior to executing a new thread of said downloadable application computer program, allocating a second non-host processor from said plurality of non-host processors, said second non-host processor for interfacing with said first DAVM to execute said new thread; and d) provided in said step c) no non-host processor from said plurality is available for executing said new thread, assigning said new thread to be executed by said first non-host processor already interfaced with said first DAVM.

28. The computer readable medium of claim 27, wherein said first non-host processor belongs to a plurality of non-host processors of said auxiliary system, said plurality of non-host processors coupled to said non-host memory.

29. The computer readable medium of claim 27, wherein said step a) and step b) are implemented using a first PCL within said host memory, said first PCL executed by said host processor.

30. The computer readable medium of claim 27, further causing said composite computer system to perform the step of:

e) provided no non-host processor from said plurality of non-host processors is available for interfacing with said first DAVM, instantiating said first DAVM in said host memory, said first DAVM interfacing with said host processor for executing one or more threads of said downloadable application computer program.

31. The computer readable medium of claim 27, wherein in said step c), said first DAVM calls start( ) method to allocate said second non-host processor to interface with said first DAVM.

32. The computer readable medium of claim 27, wherein for executing an additional downloadable application computer program, further causes said composite computer system to perform the steps of:

f) allocating a third non-host processor from said plurality of processors, said third non-host processor adapted for interfacing with a second DAVM;

g) provided said third non-host processor has been allocated, instantiating said second DAVM in said non-host memory, said second DAVM interfacing with said non-host third processor for executing one or more threads of said additional downloadable application computer program; and h) prior to executing a new thread of said additional downloadable application computer program within said second DAVM, allocating from said plurality of non-host processors for a fourth non-host processor for interfacing with said second DAVM to execute said new thread.

33. The computer readable medium of claim 32, further causing said composite computer system to perform the step of:

i) provided no non-host processor is available for interfacing with said second DAVM, instantiating said second DAVM in said host memory, said second DAVM interfacing with said host processor for executing one or more threads of said additional downloadable application computer program.

34. The computer readable medium of claim 32, further causing said composite computer system to perform the step of:

j) provided in said step h) no additional non-host processor from said plurality of non-host processors is available for executing said new thread, assigning said new thread to be executed by said third non-host processor already interfaced with said second DAVM.

35. The computer readable medium of claim 32, wherein said step f) and said step g) are implemented using a second PCL within said host memory, said second PCL executed by said host processor.

36. The computer readable medium of claim 32, wherein said step h) is performed using said second DAVM.

37. The computer readable medium of claim 27, wherein said plurality of non-host processors are ARM processors.

38. The computer readable medium of claim 27, wherein a plurality of instruction caches are coupled to said non-host processors.

39. The computer readable medium of claim 27, wherein said non-host memory is coupled as a dual port memory to said host computer system.

40. The computer readable medium of claim 27, wherein said host computer system is coupled via a bus to said non-host memory and said plurality of non-host processors.

41. The computer readable medium of claim 40, wherein said bus is a PCI bus.

42. The computer readable medium of claim 27, wherein said non-host memory and said plurality of non-host processors are housed within a PC card adapted to be coupled to said host computer system, said PC card detachable from said host computer system.

* * * * *